Feb. 13, 1934.   G. P. GRANT   1,946,687
OPERATING MECHANISM FOR CAMERAS
Filed Oct. 30, 1931   2 Sheets-Sheet 1
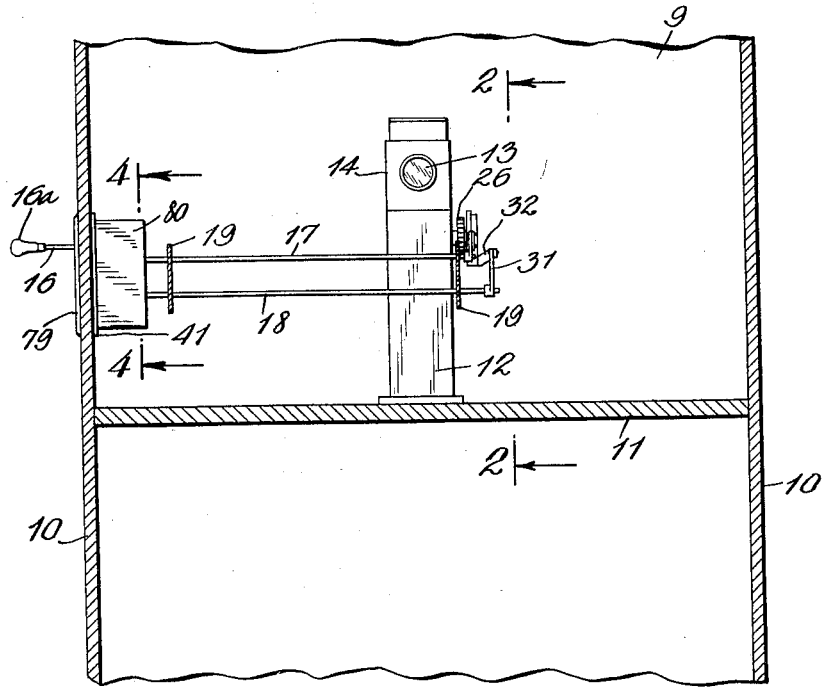
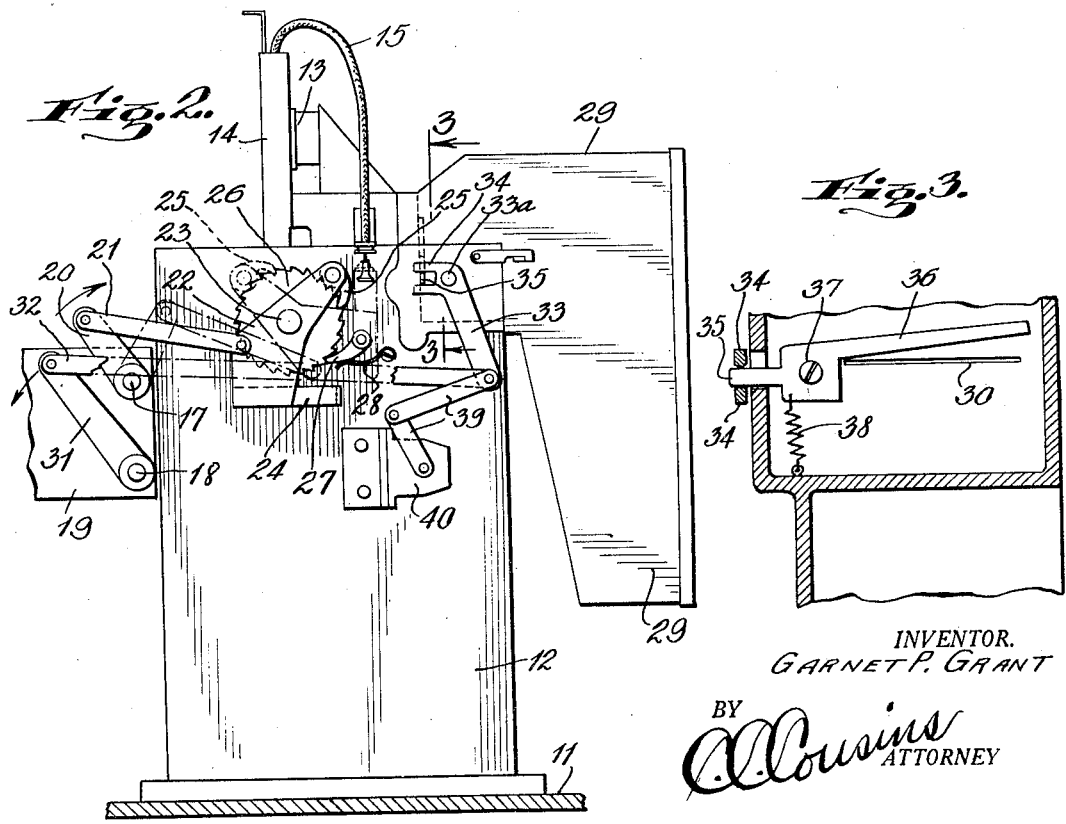
INVENTOR.
GARNET P. GRANT
BY
C. C. Cousins
ATTORNEY

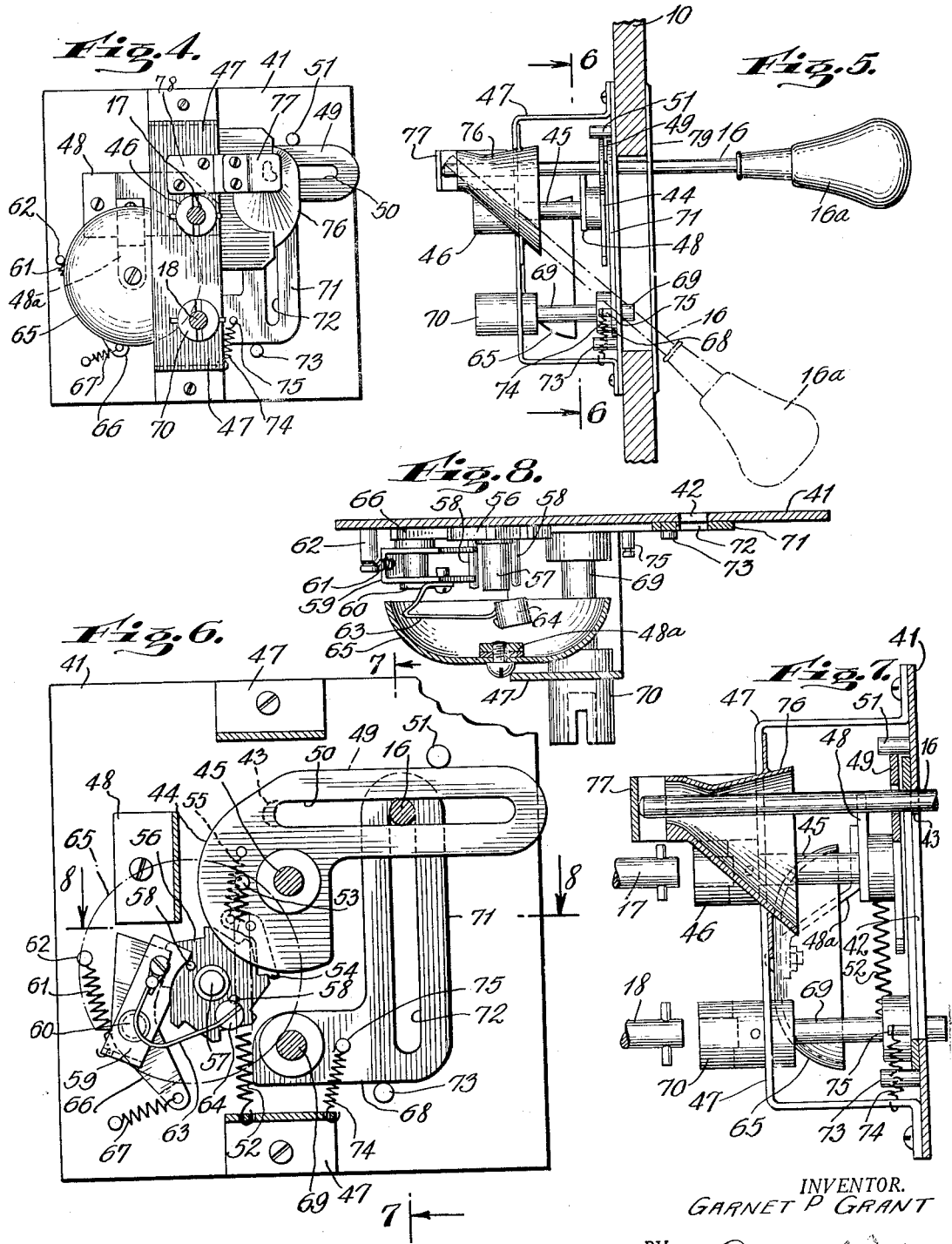

Patented Feb. 13, 1934

1,946,687

UNITED STATES PATENT OFFICE 1,946,687

OPERATING MECHANISM FOR CAMERAS

Garnet P. Grant, New York, N. Y.

Application October 30, 1931. Serial No. 572,034

16 Claims. (Cl. 95—31)

This invention relates to an operating mechanism for cameras.

In photography practice it is common to provide a booth having a camera disposed therein and means to operate the camera to make a succession of exposures on a continuous strip of sensitized paper. The subject may be taken in several poses and the resultant exposures on the strip developed into pictures which are vended to the subject.

The broad object of this invention is to provide a manually operable means to make the exposures and subsequently to cut off the strip of pictures from a roll of sensitized paper.

A further object of the invention is to provide an operating means which will be operable from the outside of the booth by the movement of a single actuating element.

A further object of the invention is to provide a removable actuating element which will be removed when the device is not in use so that an unauthorized person cannot operate the camera.

A further object of the invention is to provide a mechanism, the operation of which will consist in simply moving a key in one direction to take the pictures and in another direction to cut off the strip from the roll, so that an inexperienced user may successfully operate the camera. In this way the need of trained and highly paid attendants is eliminated.

A further object of the invention is to provide a mechanism wherein the operation will be manual so that the subject may have time to assume different poses between exposures and which will not be dependent upon a fixed timing between exposures.

A further object of the invention is to provide a simple device which will be inexpensive to manufacture and in which there will be few parts to wear or get out of order.

The invention consists of the construction, combination and arrangement of parts as herein illustrated, described and claimed.

In the accompanying drawings, forming part hereof, is illustrated one form of embodiment of the invention, in which drawings similar reference characters designate corresponding parts, and in which:

Figure 1 is a partial front elevation, the front of the booth being removed;

Figure 2 is a side elevation of a camera taken approximately on line 2—2 of Figure 1, looking in the direction indicated by the arrows;

Figure 3 is a fragmentary vertical section taken approximately on line 3—3 of Figure 2;

Figure 4 is a side elevation of the right side of an operating mechanism, the casing therefor being removed;

Figure 5 is a rear edge elevation of the operating mechanism;

Figure 6 is an enlarged vertical section taken approximately on line 6—6 of Figure 5, looking in the direction indicated by the arrows;

Figure 7 is an enlarged vertical section taken approximately on line 7—7 of Figure 6, looking in the direction indicated by the arrows; and, Figure 8 is an enlarged horizontal section taken approximately on line 8—8 of Figure 6, looking in the direction indicated by the arrows.

Referring to the drawings 9 designates a booth having side walls 10 and a transverse shelf or support 11. The booth 9 may be of any size, shape or structure desired. Disposed on the shelf 11 inside of the booth 9 is a camera 12 provided with the usual lenses 13 and shutter 14. The usual flexible cable 15 to trip the shutter 14 is provided and is fastened on one side of the camera 12.

The camera 12 is operated by a movement of a key or actuating rod 16 provided with a head or handle 16a. The key 16, through the mechanism hereinafter described, rocks a rod 17 to take the pictures and also rocks a rod 18 to cut the film. The rods 17 and 18 extend from the side wall 10 of the booth 9 to the camera 12 and are supported by brackets 19 carried by the booth 9.

In order to operate the camera the rod 17 has connected thereto a link 20 which is pivoted to a connecting rod 21 which in turn is pivoted to a rockable plate 22. The plate 22 is pivotally carried on a shaft 23 which extends into the camera 12 and on which is carried the roll of sensitized paper on which the exposures are made. The plate 22 is provided with a projecting finger 24 so that when the shaft 17 is rocked the link 20 will move in the direction indicated by the arrow on Figure 2 and will rock the plate 22 to the dotted line position shown in Figure 2 so that the finger 24 will operate the shutter-releasing means 15 and an exposure will be made.

As the plate 22 is rocked a pawl 25 carried by the plate 22 will move over the teeth of a ratchet wheel 26 to the dotted line position shown in Figure 2. The ratchet wheel 26 is carried by the shaft 23 and operates the roll of film inside of the camera 12.

When the exposure has been made the rod 17 will return to its normal position by means of a spring action hereinafter described. As the rod 17 moves back to its normal position the plate 22 will be moved to its normal position and the pawl 25 will move the ratchet wheel 26 a sufficient distance to present a new portion of film to the lens 13 in the camera 12. A dog 27 is disposed on the camera 12 in engagement with the ratchet wheel 26 to prevent movement in an opposite direction. The dog 27 is held under tension by a spring 28 carried by the camera 12. As the film is moved step by step when the exposures are made it is fed into a developing chamber 29 through a slot 30. The chamber 29 is intimately connected to the camera 12. In order to cut the strip of film off from the roll the rod 18 is operated by the key 16 through the mechanism hereinafter described. The rod 18 is provided with a link 31 to which is pivoted a connecting rod 32. The opposite end of the connecting rod 32 is connected to an actuating arm 33 which is pivoted at 33a to the chamber 29. The arm 33 is provided with spaced projecting fingers 34 which engage the handle 35 of a knife 36 disposed adjacent the slot 30 in the chamber 29. The knife 36 is movable on a pivot 37 and is provided with a spring 38 to return to normal position after it has been operated. Arms 39 are also connected to the connecting rod 32 which arms 39 operate a counter or indicator 40 to show many times the knife 36 is operated.

The mechanism to rock the rods 17 and 18 is carried by a plate 41 affixed to the side wall 10 of the booth 9. The plate 41 is provided with a vertical slot 42 and a relatively shorter horizontal slot 43 extending from the upper end of the slot 42. The slots 42 and 43 together form an opening the shape of an inverted L. The side wall 10 of the booth 9 is suitably slotted to allow movement of the key 16 in the slots 42 and 43. Disposed adjacent the plate 41 is a smaller rockable plate 44, which is carried by a shaft 45. The shaft 45 terminates in a bifurcated member 46 adapted to receive the end of the rod 17. The plate 44 is spaced sufficiently from the plate 41 to allow another member hereinafter described to be inserted between the two plates.

Carried by the plate 41 is a U-shaped bracket 47 which supports the shaft 45. A second bracket 48 is carried by the plate 41 and supports the opposite end of the shaft 45 so that the plate 44 is maintained in rockable position and the bifurcated member 46 is maintained in alignment with the shaft 17.

The plate 44 is provided with an extension 49 in which is formed a horizontal slot 50. The slot 50 is on a level with the slot 43 in the plate 41 but is longer than the slot 43. A lug 51 is carried by the plate 41 adjacent the top of the extension 49 on the plate 44 to limit the range of movement of the plate 44 in one direction. A spring 52 has one end connected to a pin 53 on the plate 44 and the opposite end connected to the bracket 47 so that the plate 44 will be returned to its normal position after it has been rocked as hereinafter described.

Carried by the plate 44 is a pawl 54 held under tension by a spring 55. The pawl 54 engages a ratchet 56 which rotates on a pivot 57 on the plate 41. Projecting fingers 58 are carried by the ratchet 56 and oppose the pressure of a U-shaped carrying member 59. The member 59 is movable on a pivot 60 and is maintained under tension by means of a spring 61 which has one end affixed to a post 62 on the plate 41. The member 59 carries a spring wire 63 on which is disposed a clapper 64 adapted to strike a bell 65. The bell 65 is supported by a projection 48a carried by the bracket 48.

The object of the bell 65 is to indicate to the operator of the device when a given number of exposures have been made. The device illustrated in the drawings is adapted to ring the bell after each fourth exposure. It will be noted that the ratchet 56 is provided with eight (8) teeth and with two (2) projecting fingers 58. Each time the plate 44 is rocked the pawl 54 will advance the ratchet 56 one step. When one finger 58 is removed from the path of movement of the member 59 the clapper 64 will ring the bell 65. As the ratchet 56 is moved further the opposite finger 58 will oppose the member 59 until it also has been moved four spaces when the bell 65 will again be rung. A dog 66, held under tension by a spring 67, is provided in engagement with the ratchet 56 to prevent movement in the opposite direction.

In order to actuate the rod 18 a rockable plate 68 is provided on the base plate 41. The plate 68 is carried by a shaft 69. One end of the shaft 69 terminates in a bifurcated member 70 adapted to receive the end of the rod 18. The member 70 is disposed through the bracket 47, and the opposite end of the shaft 69 projects through the base plate 41 so that the plate 68 is maintained in position and the member 70 is maintained in alignment with the rod 18.

The plate 68 is provided with a vertical extension 71 in which is formed a vertical slot 72. The slot 72 coincides with the slot 42 in the base plate 41. As best shown in Figure 6 the slot 72 extends to a point adjacent the center of the slot 50 in the extension 49 on the plate 44. Therefore, when the key 16 is inserted in the apex of the angle formed by the slots 42 and 43 in the base plate 41 it will pass through the center of the slot 50 and the top of the slot 72.

A lug 73 is carried by the base plate 41 adjacent the plate 68 to limit the movement of the plate 68 in one direction. A spring 74 has one end connected to a post 75 on the plate 68 and its opposite end connected to the bracket 47, so that the plate 68 will be returned to normal position after it has been rocked.

Carried by the bracket 48 is an openended conical guide 76. The small end of the guide 76 is in alignment with the apex of the angle formed by the slots 42 and 43 in the base plate 41. Adjacent the small end of the guide 76 is a bearing plate 77 carried by an auxiliary bracket 78 on the bracket 47.

Cover plate 79 may be disposed on the outside of the side wall 10 of the booth 9 adjacent the base plate 41. The cover plate 79 will be provided with slots corresponding in size and position with the slots 42 and 43 in the base plate 41. A casing 80 may be disposed around the herein described mechanism so as to completely enclose the same.

The operation of the mechanism carried by the base plate 41 is as follows:

When it is desired to make an exposure or series of exposures the key 16 is inserted through the slots 42 and 43 in the base plate 41 and through the slots 50 and 72 in the members 49 and 71, respectively. The end of the key 16 is forced against the bearing plate 77. The key 16 is then operated downwardly to the dotted line position shown in Figure 5. The line of travel of the key 16 coincides with the slot 72 so that the plate 68 is not moved but the extension 49 on the plate 44 is cammed downward so that when the key 16 is in the dotted line position shown in Figure 5 the righthand end of the slot 50 will be adjacent the lower end of the slot 72. This action will rock the shaft 45 which in turn through the member 46 will rock the shaft 17. As the shaft 17 is rocked the link 20 on its opposite end will be moved in the direction indicated by the arrow in Figure 2 and the plate 22 will be rocked to the dotted line position shown in Figure 2. The projection 24 on the plate 22 will operate the shutter-release 15, thus making an exposure. When the exposure has been made the key 16 will be returned to its normal position. The spring 52 will retract the plate 44 to its normal position and the rod 17 and its associated parts will return to their former positions. In the meantime, the ratchet 56 will have been advanced one step by the pawl 54.

The same operation will be repeated, making an exposure each time and also advancing the film or sensitized paper through the slot 30 into the chamber 29. When the fourth exposure has been made one pin 58 on the ratchet 56 will ride past the member 59 and allow the clapper 64 to ring the bell 65.

The sounding of the bell 65 will indicate to the operator that four exposures have been made. The key 16 will then be operated to the right in a horizontal direction in the slot 43 in the base plate 41. This direction will correspond to the key 16 being operated toward the lefthand side of Figure 6. The line of travel of the key 16 will now coincide with the slot 50 in the extension 49 on the plate 44, and the plate 44 will not be moved. However, the extension 71 on the plate 68 will be cammed to one side. The plate 68 will thus be rocked and will carry with it the shaft 69 which will rock the rod 18 by means of the member 70.

As the rod 18 is rocked it will move the link 31 on its opposite end in the direction indicated by the arrow on Figure 2. This will move the rod 32 and the arm 33 toward the front of the camera 12. The fingers 34 on the arm 33 will move upward and will force the knife 36 downward across the slot 30 in the chamber 29 and will cut the strip of exposed film from the roll. When this operation has been completed the spring 38 will return the knife 36 to its normal position and the spring 74 will return the plate 68 to its normal position. The key 16 may then be removed entirely from the mechanism and need only be inserted again when it is desired to make further exposures.

Having thus described the invention, what is claimed as new and desired to be secured by Letters Patent is:

1. In combination with a camera having rockable means to operate the camera, a mechanism to operate the rockable means comprising a movable member connected to the rockable means and provided with a slot and an actuating element disposed through the slot to move the movable member.

2. In combination with a camera having rockable means to operate the camera, a mechanism to operate the rockable means comprising a movable member connected to the rockable means and provided with a slot and an actuating element removably disposed through the slot to move the movable member.

3. In combination with a camera having means to operate the camera and independent means to cut a strip of film, an operating assembly to selectively move both of the aforesaid means and an actuating means to move the operating assembly.

4. In combination with a camera having means to operate the camera and independent means to cut a strip of film, an operating assembly to move both of the aforesaid means and a removable actuating means to move the operating assembly.

5. In combination with a camera having means to operate the camera and independent means to cut a strip of film, an operating assembly to move both of the aforesaid means and a single removable actuating means to move the operating assembly.

6. In combination with a camera having a rockable rod and connecting parts to actuate the camera, means to rock the rod comprising a slotted plate connected to the rod and means operable through the slot to rock the plate.

7. In combination with a camera having a means to cut a strip of film and a rockable rod and connecting links to actuate the cutting means, means to rock the rod comprising a slotted plate connected to the rod and means operable through the slot to rock the plate.

8. In combination with a camera having a rockable operating means and independent means to cut a strip of film, an actuating assembly to selectively move the first two mentioned means.

9. In combination with a camera having a rockable operating means and independent means to cut a strip of film, an actuating assembly to selectively move the first two mentioned means comprising a plurality of slotted members connected to the first two mentioned means and means to move the slotted members.

10. In combination with a camera having a rockable operating means and independent means to cut a strip of film, an actuating assembly to selectively move the first two mentioned means comprising a plurality of slotted members connected to the first two mentioned means and a single means to move the slotted members.

11. In combination with a camera having a rockable operating means and independent means to cut a strip of film, an actuating assembly to selectively move the first two mentioned means comprising a plurality of slotted members connected to the first two mentioned means and a single removable means to move the slotted members.

12. In combination with a camera having a rockable operating means and independent means to cut a strip of film, an actuating assembly to selectively move the first two mentioned means comprising a plurality of slotted members having the slots at an angle to each other and means to independently move the slotted members.

13. In combination with a camera having a rockable operating means and independent means to cut a strip of film, an actuating assembly to selectively move the first two mentioned means comprising a plurality of slotted members having the slots at an angle to each other and means to independently move the slotted members consisting of an actuating element disposed through the slots.

14. In combination with a camera having a rockable operating means and independent means to cut a strip of film, an actuating assembly to selectively move the first two mentioned means comprising a plurality of slotted members having the slots at an angle to each other and means to independently move the slotted members consisting of an actuating element disposed through the slots and adapted to be moved in one direction in one slot to move the other slotted member and in a different direction in the second slot to move the first slotted member.

15. A photographic apparatus comprising a booth, a camera in the booth, operating means carried by the camera, a mechanism carried by the booth to actuate the operating means and means operable from the outside of the booth to actuate the mechanism.

16. A photographic apparatus comprising a booth, a camera in the booth, operating means carried by the camera, and independent means to cut a strip of film, a mechanism carried by the booth to move the operating and cutting means and means to operate the mechanism from the outside of the booth.

GARNET P. GRANT.